United States Patent [19]

Zygiel, deceased

Best Available Copy

[11] E Re. 30,301

[45] Reissued Jun. 10, 1980

[54] BEVERAGE MIXING AND DISPENSING APPARATUS

[75] Inventor: Alfred E. Zygiel, deceased, late of Dallas, Tex., by Mary E. Zygiel, executrix

[73] Assignee: The Cornelius Company, Anoka, Minn.

[21] Appl. No.: 640,711

[22] Filed: Dec. 15, 1975

Related U.S. Patent Documents

Reissue of:

[64] Patent No.: 3,779,261
Issued: Dec. 18, 1973
Appl. No.: 233,513
Filed: Mar. 10, 1972

[51] Int. Cl.[2] ..... G05D 11/02

[52] U.S. Cl. ..... 137/564.5; 137/101.11; 222/129.2

[58] Field of Search ..... 137/101.11, 210, 205.5, 137/212, 564.5, 607, 3, 609; 222/129.2, 132, 135, 207; 239/405; 261/DIG. 7

[56] References Cited

U.S. PATENT DOCUMENTS

| | | | |
|---|---|---|---|
| 1,390,176 | 9/1921 | Strove | 137/564.5 |
| 2,495,210 | 1/1950 | Copping | 222/129.2 |
| 2,502,610 | 4/1950 | Wegman | 62/339 |
| 2,537,119 | 1/1951 | Bauerlein et al. | 222/129.2 X |
| 2,538,111 | 1/1951 | Luster | 222/129.2 |
| 2,618,510 | 11/1952 | Mills | 137/564.5 |
| 2,748,982 | 6/1956 | Copping | 222/108 |
| 3,040,774 | 6/1962 | Stenberg | 137/564.5 |
| 3,166,096 | 1/1965 | Lang | 137/564.5 |
| 3,187,769 | 6/1965 | McDowell et al. | 137/564.5 |
| 3,347,421 | 10/1967 | Yingst et al. | 261/DIG. 7 |
| 3,455,332 | 7/1969 | Cornelius | 137/607 X |
| 3,590,845 | 7/1971 | MacLean | 137/564.5 X |
| 3,690,340 | 9/1972 | Sipin | 137/101.11 X |
| 3,723,851 | 3/1973 | Johnson et al. | 137/609 X |

FOREIGN PATENT DOCUMENTS

| | | | |
|---|---|---|---|
| 365502 | 12/1962 | Switzerland | 137/564.5 |
| 1017786 | 1/1966 | United Kingdom | 137/564.5 |

*Primary Examiner*—William R. Cline
*Attorney, Agent, or Firm*—Henry C. Kovar

[57] ABSTRACT

Disclosed is fluid mixing apparatus employing a metering chamber divided by a flexible diaphragm. Two fluids are simultaneously injected into a mixing nozzle. The ratio of fluids is controlled by a feedback line which translates pressure from the first fluid outlet to the second fluid and thereby maintains a relatively constant ratio between the head pressures on the two fluids.

1 Claim, 2 Drawing Figures

BEVERAGE MIXING AND DISPENSING APPARATUS

Figure 1:
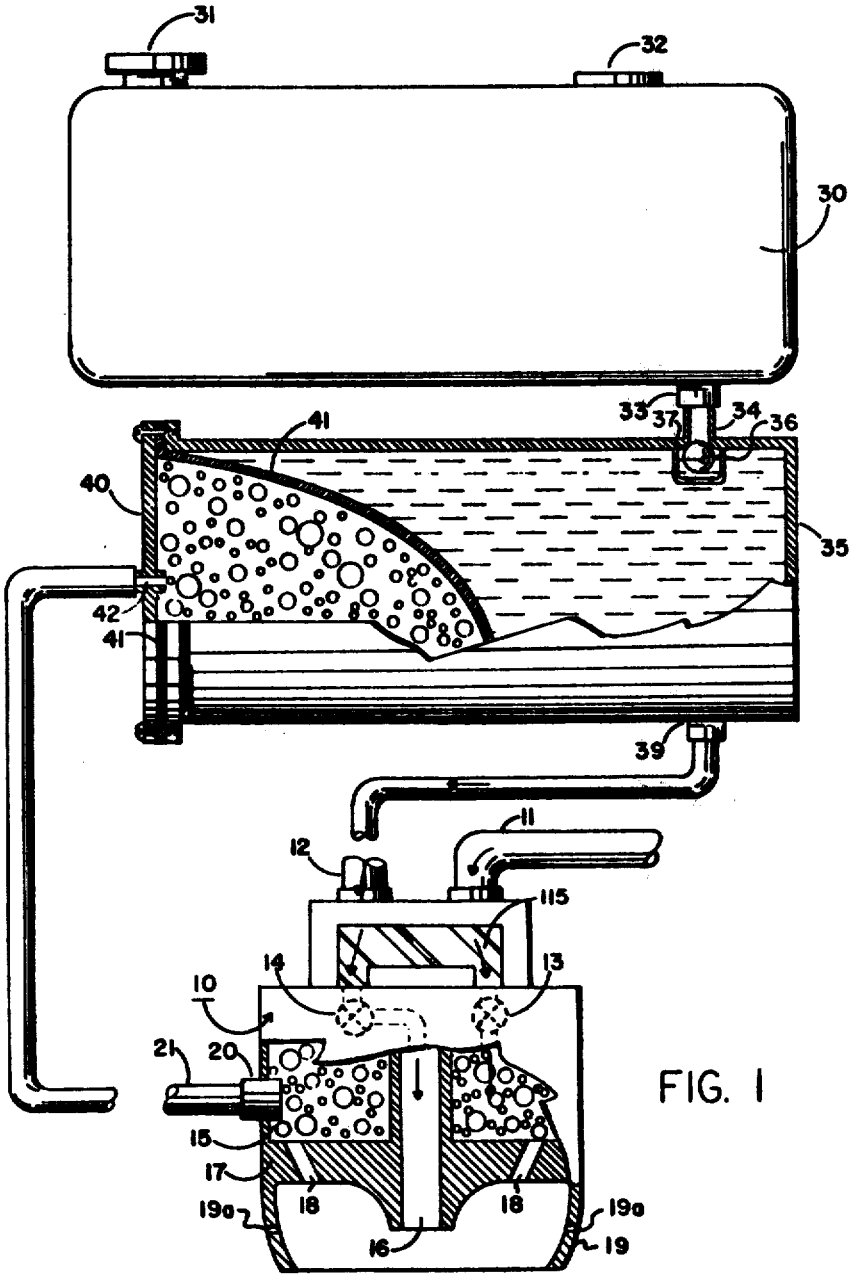

Matter enclosed in heavy brackets [ ] appears in the original patent but forms no part of this reissue specification; matter printed in italics indicates the additions made by reissue.

This invention relates to a fluid mixing and dispensing apparatus. More particularly it relates to a fluid feed-back controlled apparatus for injecting metered amounts of one fluid into a stream of another fluid.

In various fluid handling systems it is desirable and often required to inject metered amounts of one fluid into a stream of another fluid. Accordingly, various types of fluid handling systems have been developed.

In many fluid mixing systems it is desirable that the mixing apparatus be extremely simple, inexpensive and operable without the use of electrically operated valves or the like requiring an external power source. For example, artifically and naturally flavored beverages are commonly sold in concentrated syrup form which may be mixed with water or carbonated water to prepare individual beverages. Because of the instability of carbon dioxide saturated liquids, the beverages are conventionally prepared by mixing a measured amount of syrup with a measured amount of carbonated water, thereby producing a carbonated beverage, immediately prior to serving. Conventionally, such dispensing apparatus employs a mixing and dispensing valve wherein the carbonated water and syrup are supplied under pressure to simultaneously operable valves. Upon operation of the two valves concentrated syrup and carbonated water are injected into a single stream and the mixed liquids dispensed into a container. The ratio of syrup to water is determined by the relative sizes of the valve openings and head pressures on the liquids. Since the valve openings are of fixed dimensions, variations in head pressure on either liquid will cause variations in the mix ratio. Because of the instability of carbonated water, head pressure on a closed container of carbonated water may vary widely during and between periods of use. Accordingly, unless the pressure on the syrup reservoir is varied proportionately the ratio of syrup to carbonated water may vary widely, resulting in dispensed beverages of inconsistent quality.

In accordance with the present invention a dispensing apparatus is provided in which the head pressure on [the] concentrate [container] is directly proportional to the head pressure of the carbonated water. Accordingly, as the pressure in the carbonated water stream varies the head pressure on the syrup is subjected to a proportional change, thereby resulting in a drink mixture of uniform and consistent quality. The apparatus includes a feedback line connected between the dispensing nozzle and [an enclosed] *a* concentrate [reservoir] *metering chamber*. The feed-back fluid is injected into the [reservoir] *metering chamber* but separated from the fluid therein by a diaphragm. Accordingly, pressure on the feedback system will vary with pressure of the carbon dioxide water stream. The pressure variations in the carbon dioxide water stream are thereby transferred to the concentrate [reservoir] causing a proportionate change in the concentrate head pressure.

Through the use of the pressure feed-back system a proportional pressure [dipensing] *dispensing* apparatus is provided which employs no electrically or manually operated valves and may be completely operable without the use of any external power source. The apparatus may be inexpensively fabricated from conventional materials and advantageously automatically maintains a constant ratio of concentrate to water regardless of the pressure on the water stream. As an added advantage water in the feed-back loop is allowed to drain through the mixing nozzle at the end of the mixing cycle, thereby automatically washing the mixing nozzle.

Figure 2:
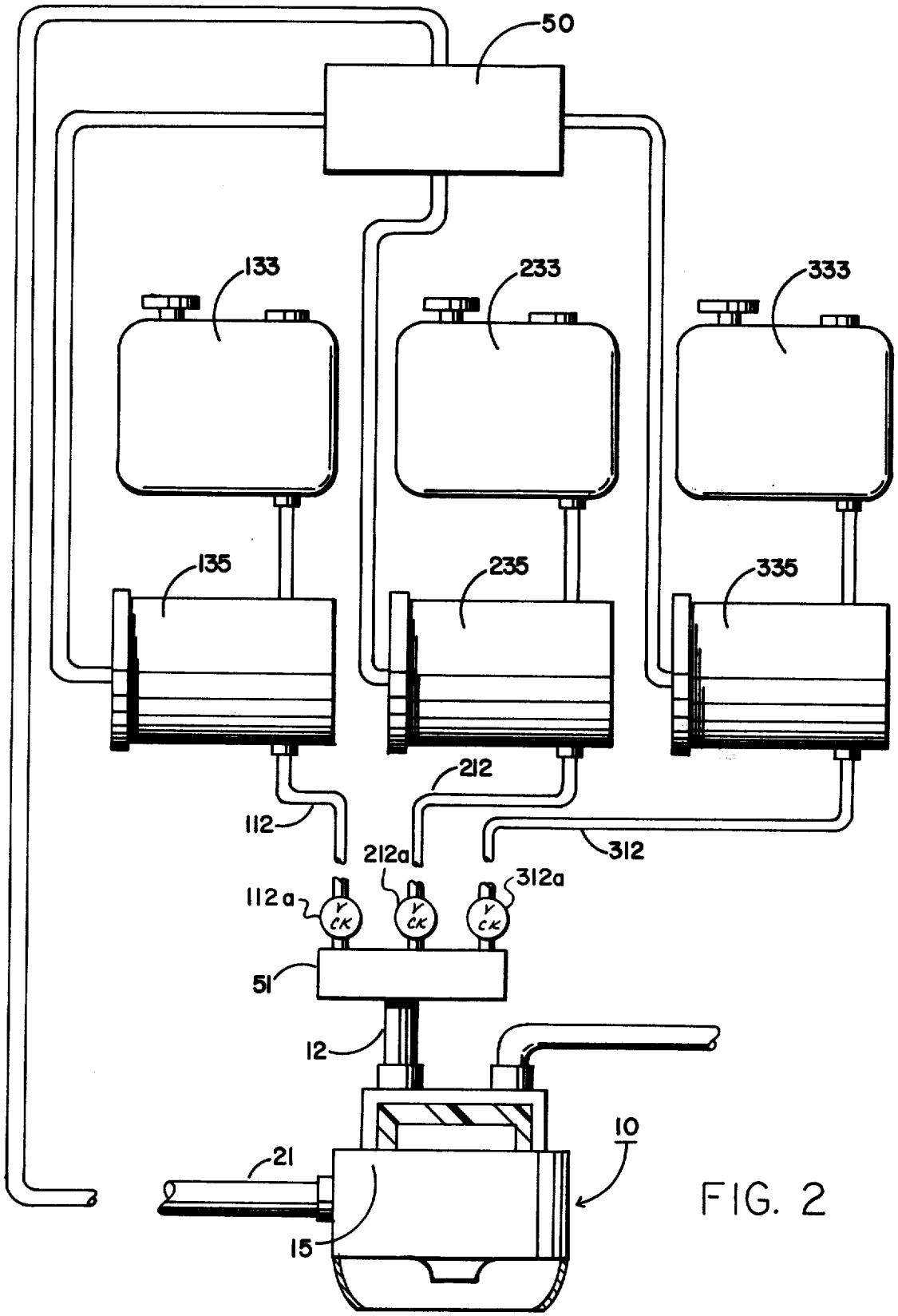

Other features and advantages of the invention will become more readily understood when taken in connection with the appended claims and attached drawings in which:

FIG. 1 is a diagrammatical representation of the preferred embodiment of the invention, and FIG. 2 is a diagrammatical representation of a multi-head dispensing unit employing the mixing and dispensing apparatus.

A diagrammatical representation of a beverage mixing and dispensing device employing the principles of the invention is illustrated in FIG. 1. While the illustration relates to apparatus for mixing concentrated syrup with carbonated water to provide a carbonated beverage, it will be readily appreciated that the principles of the invention may be applied to various other systems wherein one fluid is injected into a stream of another fluid. The apparatus as shown in the preferred embodiment is illustrated merely to demonstrate the principles of the invention as applied to one conventional dispensing system.

As illustrated in FIG. 1 the apparatus comprises a conventional dispensing head 10 into which carbonated water and concentrated syrup are injected through separate inlet lines 11 and 12, respectively. The flow of water through the dispenser is controlled by valve 13. Likewise, the flow of syrup is controlled by valve 14. As illustrated, valves 13 and 14 are conventionally operated simultaneously by a single actuating lever 115.

In the conventional dispensing apparatus water passes through valve 14 into a downwardly projecting nozzle 16 centrally located in chamber 15. Annular chamber 15 has a downwardly extending opening which is partially obstructed by a diffuser plate 17 having apertures 18 passing therethrough. Accordingly, water passing through line 11 and valve 13 into annular chamber 15 is directed downwardly through diffuser 17 into a mixing nozzle 19.

In the preferred embodiment the apertures are slanted inwardly and horizontally so that the water passing therethrough forms a swirling stream. The syrup is injected through line 12, valve 14 and inlet 16 into the water stream each time the actuating lever 115 is actuated.

Inlet 16 is preferably centrally located so that the syrup is injected into the approximate center of the swirling water stream, thereby assuring complete mixing of syrup and water. The mixture then exits through nozzle 19. If desired, nozzle 19 may be provided with holes 19a which will allow fluid to escape from nozzle 19 if the lower end is accidentally obstructed, thereby insuring that the syrup metering apparatus will not be accidentally damaged by over pressurization.

With valves 13 and 14 closed, all fluid drains from inlet 16 and chamber 15. However, when the lever 115 is actuated to open valves 13 and 14 carbonated water flows through valve 13 into chamber 15. Then, depending upon the size of apertures 18 in diffuser 17 and the pressure on the carbonated water, the chamber 15 is filled with carbonated water. The pressure on the water in chamber 15 is, of course, dependent upon the size of apertures 18 and the pressure in line 11.

In accordance with the invention a by-pass outlet 20 communicating with by-pass line 21 is connected with chamber 15 through which fluid may flow into by-pass line 21 whenever the pressure on the fluid in chamber 15 exceeds atmospheric pressure.

Carbonated water is provided to inlet line 11 by any conventional source or from a carbonator as described in co-pending application Ser. No. 215,925 filed Jan. 5, 1972 *(now abandoned)*. Concentrated syrup is supplied from a reservoir 30.

The reservoir 30 is provided with a conventional filler cap 31 and filtered air inlet 32. The air inlet is provided simply to maintain the pressure within the reservoir 30 at atmospheric and may be conveniently located in the filler cap 31 if desired. Reservoir 30 is provided with an exit aperture 33 at its lowest point communicating with a conduit 34 which conducts fluid into a metering chamber 35. Conduit 34 is provided with a check valve which allows syrup to drain under the force of gravity from the reservoir 30 into metering chamber 35 but prevents fluid flow in the reverse direction. For this purpose a simple caged floating ball 36 may be provided which seats in the neck 37 of the inlet aperture. Accordingly fluid will flow freely from reservoir 30 through conduit 34 into metering chamber 35 but cannot flow in the reverse direction.

In the preferred embodiment the metering chamber 35 is an open-ended cylindrical chamber with outlet 39 near its closed end. The open end is covered with a sealing plate 40. A flexible diaphragm 41 is positioned between the open end of chamber 35 and the sealing plate 40. Diaphragm 41 may be a thin flexible plastic or elastic material such as rubber which may be easily distorted. [In] *The diaphragm 41 is a collapsable membrane secured to the periphery of the metering chamber 35 and in* the preferred embodiment diaphragm 41 is a thin collapsible cylinder which may be expanded with very little pressure differential thereacross. An inlet means 42 is provided in sealing cap 40 providing fluid communication between by-pass line 21 and the interior of chamber 35. It will thus be observed that as fluid flows through by-pass line 21 into chamber 35, diaphragm 41 is distorted but maintains physical separation between carbonated water injected into the chamber and the syrup in the chamber.

For operation a supply of carbonated water is connected to inlet 11 and beverage concentrate placed in reservoir 30. The concentrate will drain through outlet 33 and [counduit] *conduit* 34 into the metering chamber 35 until metering chamber 35 is filled with concentrate. Since diaphragm 41 is thin and collapsible, the syrup will collapse the diaphragm 41 and completely fill the metering chamber 35. The concentrate will also fill the exit conduit 12.

Activation of lever 115 opens valves 13 and 14 simultaneously. Accordingly, carbonated water flows through valve 13 into chamber 15 and through by-pass line 21 into metering chamber 35. As carbonated water flows through by-pass line 21 the diaphragm 41 is distorted to equalize the pressure thereacross, while separating the syrup and water. As the pressure on the concentrate is increased ball 36 blocks the aperture 37 and syrup is forced through exit 39, line 12 and into the outlet 16. It will thus be observed that as the pressure on the carbonated water in line 11 is increased, pressure in by-pass line 21 and on diaphragm is also increased, thereby proportionally increasing the pressure on the syrup. Accordingly, the ratio of water to syrup remains relatively constant regardless of the pressure on the carbonated water line 11.

When [valve] *valves* 13 and 14 are closed, stopping the flow of carbonated water and syrup through lines 11 and 12, respectively, the water drains from chamber 15, thus releasing the pressure in line 21 and on diaphragm 41. Accordingly, syrup concentrate flows from reservoir 30 into the metering chamber 35, refilling the metering chamber and forcing the water therein to return to chamber 15 by way of by-pass line 21. The released water passing back through chamber 15 washes the nozzle 19 after each operation.

From the foregoing it will be observed that the by-pass mechanism provides means for varying the head pressure on the concentrate in direct relation to the pressure on the carbonated water. Accordingly, the ratio of syrup to water is relatively constant regardless of water pressure. It will also be observed that the [mechanixm] *mechanism* advantageously avoids the use of any electrically operated valves or pumping mechanism and operates automatically with very few moving parts. Accordingly, the apparatus may be inexpensively constructed to provide apparatus which dispenses concentrated beverage mixes with a high degree of consistency and uniformity.

As noted above, the by-pass pressure will be dependent on the size and number of apertures in the diffuser 17. In conventional systems water is injected into chamber 15 under about 50 psi pressure. It has been found that when the diffuser has about twelve apertures 18 of about 0.031 inch diameter, the pressure in by-pass line 21 will be about 3 to 6 psi and will vary with variations in water inlet pressure. To provide maximum mixing, the apertures 18 should be slanted about 32° from vertical and tilted about 8°.

Referring now to FIG. 2, a modified apparatus utilizing the principles of the invention is illustrated. The modified apparatus of FIG. 2 comprises a dispensing head 10 as described hereinabove with reference to FIG. 1. The mixing head 10 is provided with a by-pass line 21 communicating with chamber 15 as described hereinabove.

The system illustrated in FIG. 2, however, includes a plurality of individual reservoirs 133, 233 and 333 and metering [chamber] *chambers* 135, 235 and 335 as described hereinabove with reference to FIG. 1. By-pass fluid flowing through line 21 is selectively directed to one of the metering [chanbers] *chambers* 135, 235 or 335 by means of a selector *switch* valve 50 which may be manually or automatically operated.

[Concentrate] *Concentrates* of different flavors [is] *are* placed in each reservoir 133, 233 and 333 and the outlet lines 112, 212 and 312 from each metering chamber, respectively, are in fluid communication with a manifold 51 which in turn communicates with the concentrate inlet 12. Outlet lines 112, 212 and 312 may be provided with [a] check valves 112a, 212a and 312a to prevent intermixing of concentrate *and which permit fluid to flow from the metering chambers 135, 235 and 335 to the check valves 112a, 212a and 312a only when the pressure in a metering chamber is greater than atmospheric,* or with a selector *switch* valve which operates in conjunction with *and includes means for simultaneous*

*activation with* selector switch valve 50 to allow fluid to flow from the selected outlet only.

It will be observed that the apparatus illustrated in FIG. 2 operates in essentially the same manner as apparatus illustrated in FIG. 1. However, the operation of selector valve 50 permits the alternate selection of different flavors of concentrates to be mixed with the carbonated water.

While the invention has been described with particular reference to apparatus for mixing concentrated syrups with carbonated water, it will be readily understood that the principles may be readily applied to other fluids. For example, concentrated natural juices may be mixed with water in the same manner. Likewise, other arrangements may be employed utilizing the principles disclosed to provide multi-head dispensers and the like.

It is to be understood that although the invention has been described with particular reference to specific embodiments thereof, the forms of the invention shown and described in detail are to be taken as preferred embodiments of same, and that various changes and modifications may be resorted to without departing from the spirit and scope of the invention as defined by the appended claims.

I claim:

[1. Apparatus for mixing fluids comprising a. first valve means for injecting a first fluid into a mixing chamber adapted for directed said fluid in a downwardly directed stream, b. second valve means for injecting a second fluid into said stream, c. a reservoir for said second fluid, d. a metering chamber in fluid communication with said reservoir, e. check valve means permitting fluid flow from said metering chamber to said reservoir, f. by-pass means for conducting said first fluid from said mixing chamber to said metering chamber, g. diaphragm means within said metering chamber for separating said first fluid and second fluid, and h. means for conducting said second fluid from said metering chamber to said second valve means.]

[2. Apparatus as defined in claim 1 wherein said reservoir and metering chamber are constructed to permit gravity flow of said second fluid from said reservoir to said metering chamber.]

[3. Apparatus as defined in claim 1 wherein said diaphragm means is a collapsible membrane secured to the periphery of said metering chamber and adapted to be expanded by said first fluid entering said metering chamber via said by-pass means.]

[4. Apparatus as defined in claim 1 including means for simultaneously opening said first and second valve means.]

[5. Apparatus as defined in claim 1 wherein said mixing chamber is an annular chamber surrounding the outlet for said second fluid and includes a plurality of apertures surrounding the nozzle of said outlet, whereby first fluid escaping from said mixing chamber forms a downwardly directed stream which flows over the end of said nozzle.]

[6. Apparatus as defined in claim 5 wherein said apertures are arranged to generate a swirling flow of liquid passing therethrough.]

[7. Apparatus for selectively mixing fluids comprising a. first valve means for injecting a first fluid into a chamber adapted for directing said fluid in a downwardly directed stream b. second valve means for injecting another fluid into said stream c. a plurality of reservoirs for other fluids, d. a plurality of metering chambers, one metering chamber being in fluid communication with one of said reservoirs, e. means permitting fluid flow from each reservoir into the metering chamber in fluid communication therewith and preventing fluid flow from said metering chambers to said reservoirs, f. by-pass means and switch valve means operative to selectively conduct said first fluid from said chamber to any of said metering chambers, g. diaphragm means for separating said first fluid and other fluid in said metering chamber, and h. means for conducting fluid from said metering chambers to said second valve means.]

[8. Apparatus as defined in claim 7 wherein said means for conducting fluid from said metering chambers includes a conduit from each of said metering chambers to a second switch valve means operative to selectively switch any one of said conduits into fluid communication with said second valve means.]

[9. Apparatus as defined in claim 8 including means for simultaneously activating said switch valve means and said second switch valve means.]

[10. Apparatus as defined in claim 7 wherein said means for conducting fluid from said metering chambers to said second valve means comprises a conduit from each metering chamber to said second valve means, each conduit terminating at a check valve which permits fluid to flow from said metering chamber to said check valve only when the pressure in said metering chamber is greater than atmospheric.]

[11. The method of mixing fluids comprising the steps of a. injecting a first fluid into a first chamber having apertures therein for directing said fluid into a downwardly directed stream, b. injecting a second fluid into said downwardly directed stream from a second chamber, d. diverting fluid from said first chamber to said second chamber, d. separating said first fluid and said second fluid by a flexible diaphragm, whereby said first fluid diverted to said second chamber exerts pressure on said second fluid in said second chamber.]

*12. A beverage mixing and dispensing apparatus comprising:*

*(a) a dispensing head for mixing of water and beverage concentrate;*

*(b) a water line having one end for being connected to a supply of pressurized water, a normally closed dispensing valve selectively actuatable for control of flow of water through the line, and a water chamber downstream of the valve and having a partially obstructed outlet opening for developing a bypass pressure in the chamber during flow of water therethrough, the opening being in fluid communication downwardly through the dispensing head to ambient;*

*(c) a non-pressurizable reservoir for containing a supply of beverage concentrate;*

*(d) a normally non-pressurized metering chamber in fluid communication with the reservoir, said metering chamber being lower than the reservoir and fillable*

*from the reservoir by the force of gravity upon concentrate in the reservoir;*

*(e) an automatic check valve between the reservoir and the metering chamber for allowing concentrate flow from the reservoir to the metering chamber under the force of gravity and for preventing concentrate flow from the metering chamber to the reservoir;*

*(f) a concentrate line connecting the metering chamber to the dispensing head, there being a valve in the concentrate line for controlling flow of concentrate therethrough;*

*(g) a bypass line connecting the water chamber to the metering chamber, for bypassing water from the water chamber to the metering chamber only under the bypass pressure formed by the flow of water through the partially obstructed opening and for intermittently pressurizing the metering chamber with the bypass pressure concurrently with and only upon opening of said dispensing valve; and*

*(h) a thin collapsible and expandable cylindrical diaphragm of thin, elastic and easily distortable rubber, said diaphragm being positioned in the metering chamber for physically separating concentrate and bypassed water, and being*

*(1) elastically distortably expandable under the bypass pressure and upon flow of bypassed water flowing into the metering chamber for pressurizing the concentrate in the mixing chamber and forcing concentrate through the concentrate line to the dispensing head, and being*

*(2) collapsible within the metering chamber and under the pressure of flow of concentrate under the force of gravity into the metering chamber, said metering chamber being completely fillable with concentrate upon such collapse of said diaphragm and without pressurization of the reservoir.*

* * * * *